M. & E. M. DEILLER.
TOBACCO STRIPPING AND BOOKING MACHINE.
APPLICATION FILED AUG. 1, 1914.

1,287,906.

Patented Dec. 17, 1918.
6 SHEETS—SHEET 1.

WITNESSES:
Howard P. King
Mildred E. Brooks

INVENTORS:
Martin Deiller
and Eugene M. Deiller,
BY Russell M. Everett,
ATTORNEY.

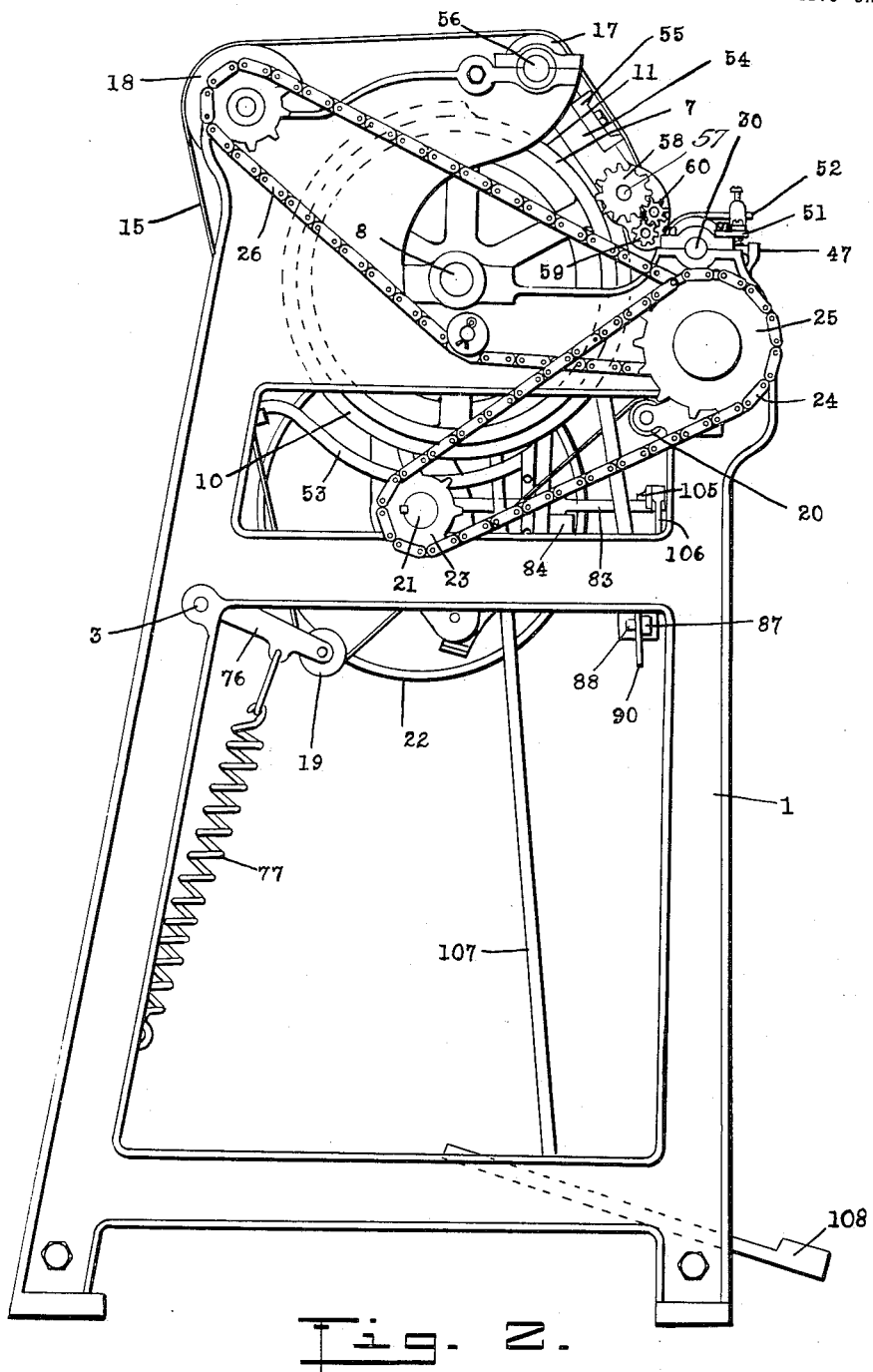

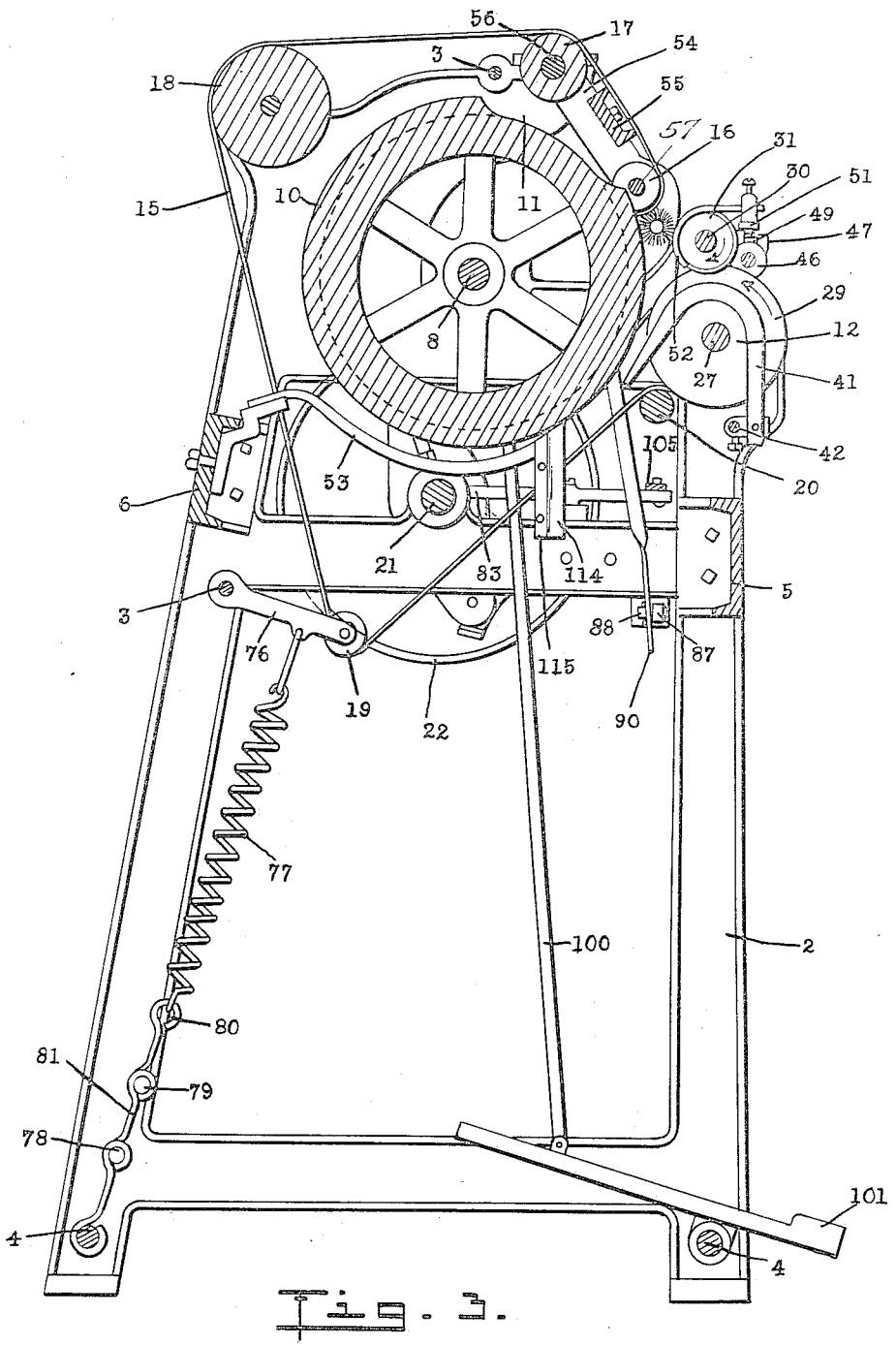

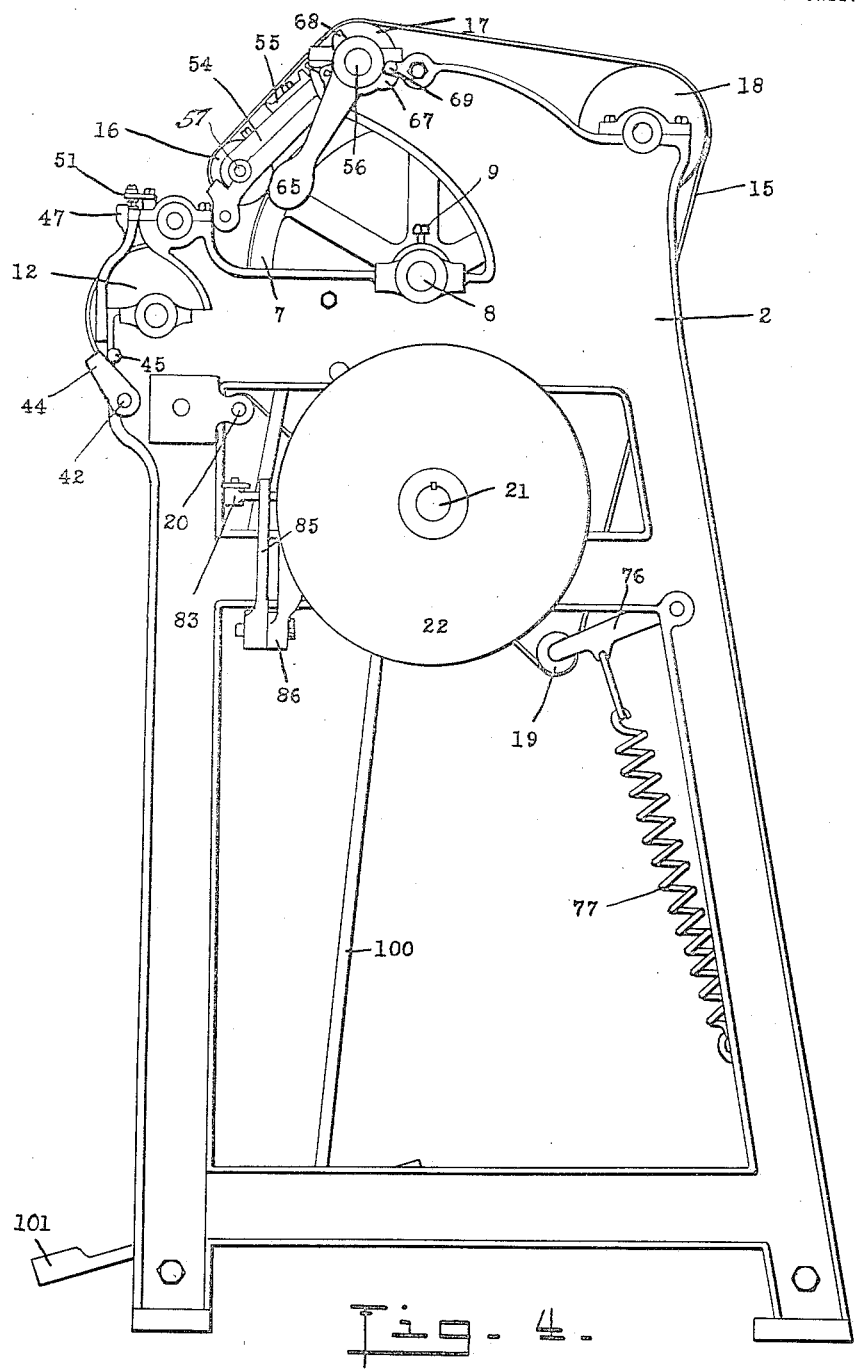

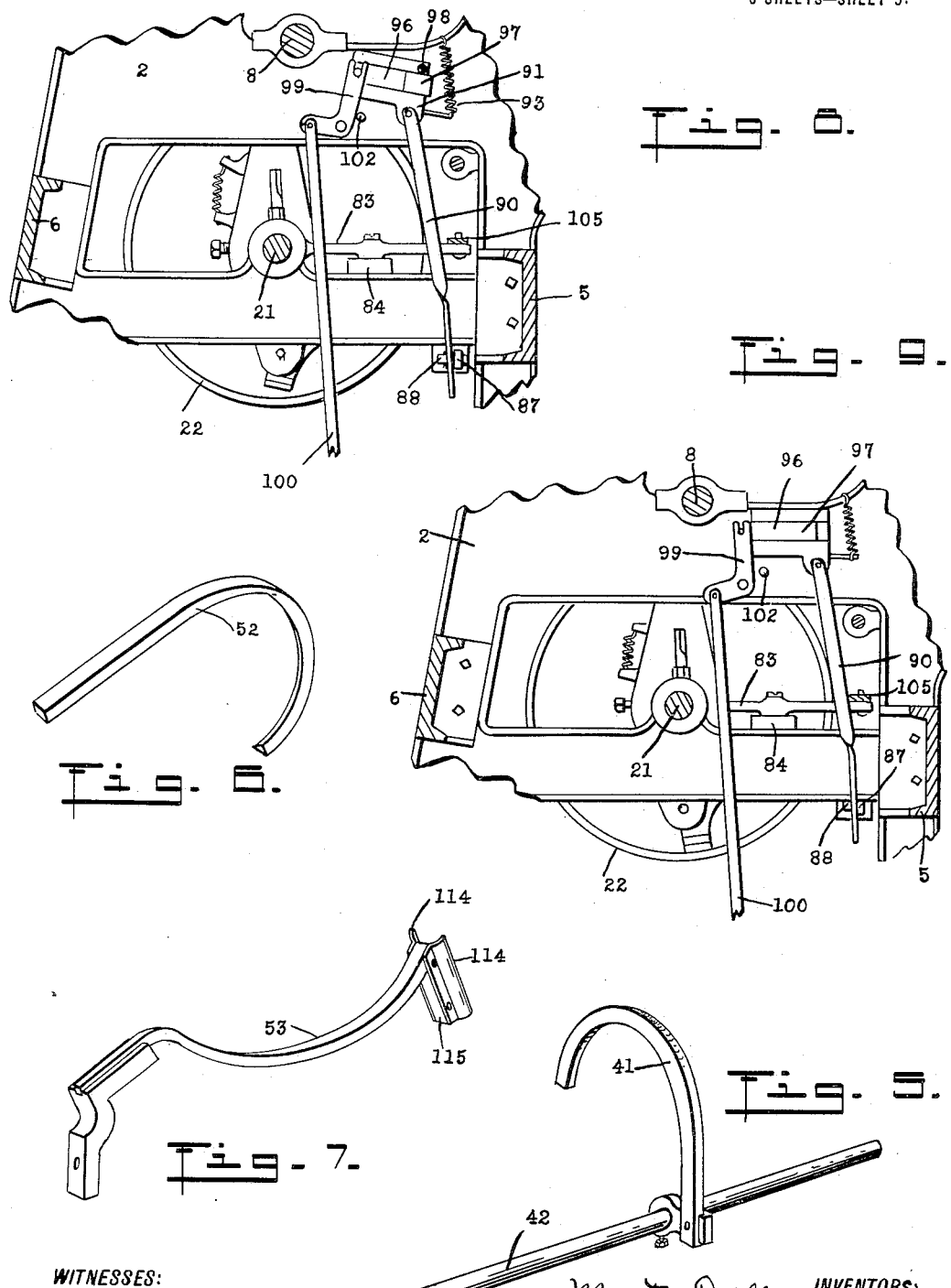

M. & E. M. DEILLER.
TOBACCO STRIPPING AND BOOKING MACHINE.
APPLICATION FILED AUG. 1, 1914.
1,287,906.
Patented Dec. 17, 1918.
6 SHEETS—SHEET 6.
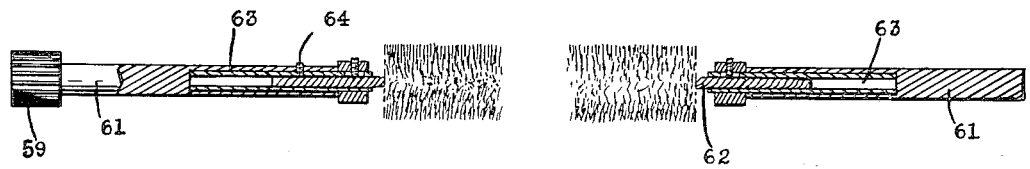
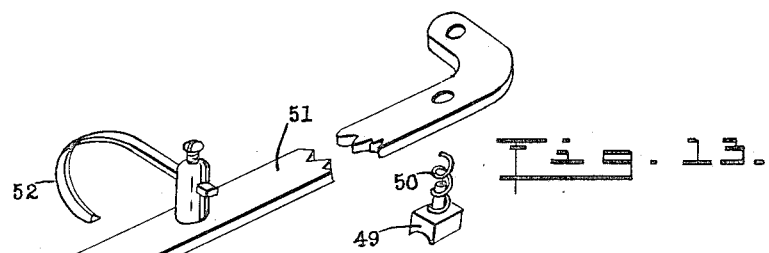
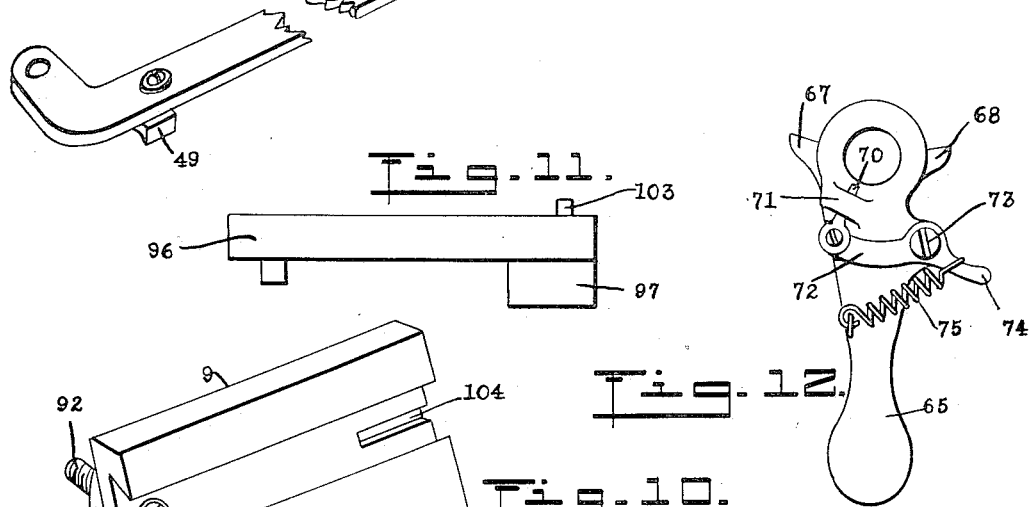
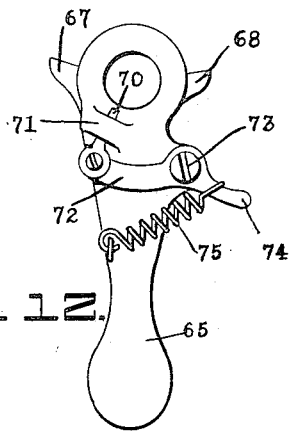
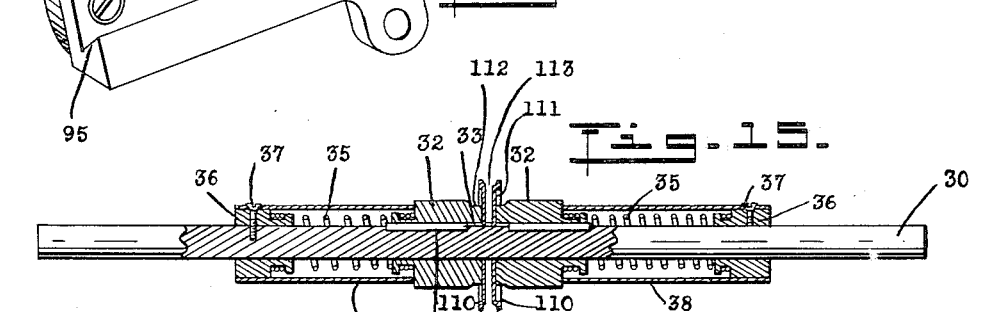

UNITED STATES PATENT OFFICE.

MARTIN DEILLER, OF HARRISON, AND EUGENE M. DEILLER, OF IRVINGTON, NEW JERSEY.

TOBACCO STRIPPING AND BOOKING MACHINE.

1,287,906.  Specification of Letters Patent.  Patented Dec. 17, 1918.

Application filed August 1, 1914. Serial No. 854,445.

*To all whom it may concern:*

Be it known that we, MARTIN DEILLER and EUGENE M. DEILLER, citizens of the United States, and residents, respectively, of Harrison, in the county of Hudson and State of New Jersey, and Irvington, in the county of Essex and State of New Jersey, have invented certain new and useful Improvements in Tobacco Stripping and Booking Machines, of which the following is a specification.

The objects of this invention are to secure a tobacco stripper which strips the stems clean and without breaking the same, even at the small or tip end; to provide for this purpose mechanism which guides the leaf so as to keep the stem in proper alinement; to avoid tearing the leaves or halves of leaves, especially by entanglement in the machine; to thus provide a machine which conserves and economizes material; to perform the stripping in advance of the booking, or strip a considerable portion of the length of the leaf before it is caught between the drum and belts; to book the leaves or halves of leaves accurately and exactly; to secure an underfeed to the booking drum, or feed the leaves to the drum beneath the same; to provide improved means for guiding the stems after they have been cut out of the leaves; to provide improved adjustable tension means for the booking belts; to drive said drum from the belts, and the cutter and brush from said belts; to provide cutting means separate from the drum and located at a distance therefrom, so as to be exposed and accessible; to provide means for regulating the aperture or guideway into which the stems of the leaves are fed; to provide an exposed and accessible brush for preventing the leaves from following the belts off of the drum so that it can be seen and reached; to provide improved control means for starting and stopping the machine and to avoid interference between the automatic control means and the manual or foot control means; to secure a simple compact construction, and to secure other advantages and results as may be brought out in the following description.

Referring to the accompanying drawings, in which like numerals of reference indicate the same parts throughout the several views, Figure 1 is an elevation of the improved machine from the front or where the operator sits;

Fig. 2 is an elevation of the machine looking at its left-hand side, or side at the operator's left-hand;

Fig. 3 is a vertical sectional view from front to rear of the machine, taken on line 3—3 Fig. 1;

Fig. 4 is an elevation of the machine looking at its right-hand side, or side at the operator's right-hand;

Figs. 5, 6 and 7 are detail perspective views of certain stem guides hereinafter more particularly described;

Figs. 8 and 9 are views of the clutch-operating mechanism taken on line 8—9 Fig. 1 and looking in the direction indicated by the arrow, said figures showing, respectively, the position of parts when the clutch is thrown out and when it is thrown in;

Fig. 10 is a detail perspective view of the control trip with its slide removed;

Fig. 11 is the top edge view of said slide;

Fig. 12 is a view of the apron operating handle from its inner side;

Fig. 13 is a perspective view of the spring pressure means for the idle foot roll, one of the shoes being detached for greater clearness;

Fig. 14 is a view of the brush partly in central longitudinal section, and

Fig. 15 is a view of the knives and knife shaft partly in longitudinal section.

Figure 1:
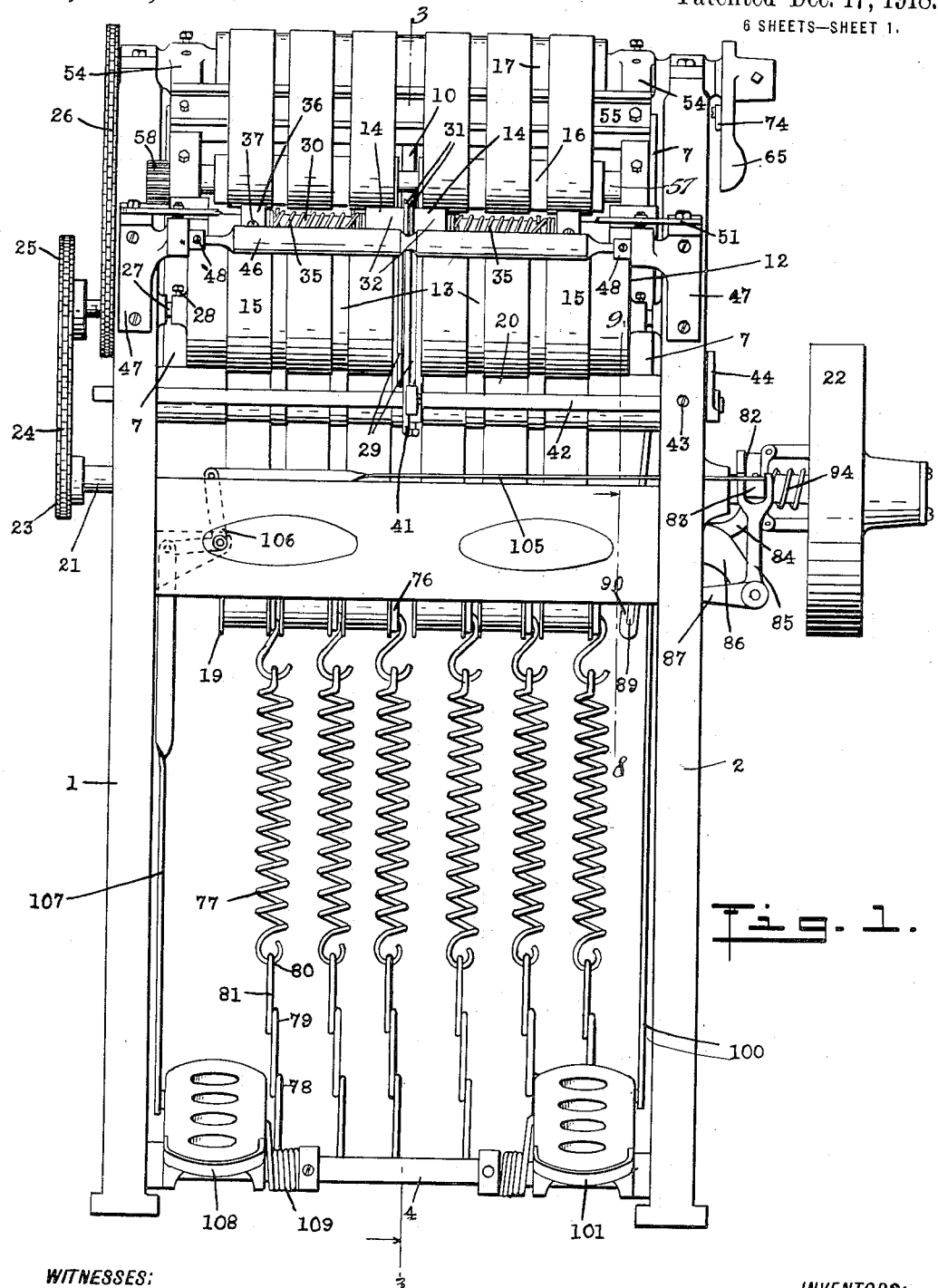

In the specific embodiment of the invention shown in said drawings, 1, 2 indicates suitable side pieces or frames connected by tie-rods 3, 4 and struts or braces 5, 6. Between the upper parts of said side frames 1, 2 is mounted a drum, comprising end sections 7, 7, made fast upon a shaft 8, as by set screws 9, in spaced relation to each other, the space between said drum sections 7, 7 being substantially the width of the cut to be made in removing the stems of the tobacco leaves to be stripped. Between the adjacent ends of said drum sections 7, 7 is a circumferential projecting flange 10, preferably closing the space between the drum sections and preferably having a portion of itself cut away as at 11 to be flush with the drum sections thereat.

At the front of the machine and preferably mounted upon an axis slightly below that of the drum, is a cutter roller 12 comprising end sections 13, 13 which coöperate with the sections 14, 14 of a cutter to remove the stems from the leaves. Around these roller sections 13, 13 extend a plurality of belts 15 which pass rearwardly over said roller sections and then beneath the drum, lying against said drum for the greater part of its circumference and leaving it at an upper point of the front side of the drum or same side at which they entered beneath it. As shown in the drawings, the circumferential points at which the belts enter beneath the drum and leave the same are about sixty degrees apart, the point of entering being about as far below a horizontal diametric plane of the drum as the point of leaving is above such a plane, although it is not intended to hereby restrict the invention to that angle. Where the belts leave the drum they turn backward and upward around a roller 16, and then they extend over a forward top roller 17, a rear top roller 18, individual tension roller 19 at some distance below the drum, and extend upwardly forward over a small lower front roller 20 adjacent the cutter roll and adapted to guide the belts beneath the same to extend upward in front of it, all as clearly shown in Fig. 3 of the drawings.

A driving shaft 21 is mounted in the side frames preferably below the drum sections 7, 7, and extends at one end beyond the side frame and carries a driving pulley 22 adapted to receive a belt (not shown) from any suitable source of power. At the other end, said shaft projects beyond the side frame and carries a sprocket wheel 23 which drives by means of a chain 24 a sprocket wheel 25 on the shaft 27 of the cutter roller 12. Furthermore the rear top roller 18 is driven at the same rate of speed as the roller 12 by any suitable means such as the chain 26 between said rollers. It will be noted that the belts are driven by engagement with the rollers 12 and 20 and the drum is driven by said belts the number of belts and their engagement with the drum circumferentially being sufficient for driving purposes in addition to and without detracting from their booking function. The cutter roll 12 preferably comprises the shaft 27 upon which are slidably mounted the roll sections 13, 13 adapted to be clamped in any position to which they are adjusted with respect to each other, by the set screws 28. It will be understood that these cutter roll sections 13, 13 are moved nearer together or farther apart to accommodate the width of stem of the tobacco of different kinds, and at their adjacent ends the roll sections 13, 13 have disks 29, 29 which project beyond the roll sections and form annular cutting flanges preferably beveled from their outer sides somewhat bluntly inward as shown.

Above the cutter roll is arranged the cutter proper, comprising a shaft 30, see Figs. 1 and 15, with knives 31, 31 which work between the flanges 29, 29 of the cutter roll and are provided with hubs 32, 32 projecting away from each other and forming long bearings on the shaft 30. Said hubs each have a longitudinal slot 33 receiving a key 34 on the shaft 30, by means of which the hub and its knife rotates with the said shaft and yet is slidable longitudinally thereof. We provide resilient means for normally holding said knives slid apart in frictional engagement with the cutting flanges 29, 29, and for regulating the resilient tension we preferably employ the following structure. A helical spring 35 on the shaft 30 is connected to the end of each hub away from its knife and also connected at its other end to a collar 36 made fast on the shaft 30, as by a set screw 37, these springs being under tension so as to draw the two knives apart and cause them to press against the inner sides of the cutter roll flanges 29, 29. Preferably the springs are inclosed for excluding dirt, suitable sleeves 38 being shown, see Fig. 15, fastened to the collars 36 and extending to the hubs over the springs. When the knife shaft is removed from the machine, as in Fig. 15, the springs of course seat the hubs against the ends of the sleeves, but when assembled in the machine the cutting flanges 29 of the cutter rolls hold said hubs slightly away from the sleeves. The knives 31, 31 being thus held in frictional engagement at their margins with the margin of the cutter roll flanges 29, 29 will be rotated by said flanges in unison therewith, and will not only cut the tobacco with a sharp true cut, but will discharge the stems freely and exert no tendency to entangle said stems. However, if desired said knives could be driven from the cutter roll shaft positively, as by having intermeshing gears on the respective shafts.

The stem of a tobacco leaf is fed in between the flange 29, 29 of the cutter roll, with either end first, and the side portions of the leaf are spread out upon the roller sections 13, 13 and the belts 15 thereon. In order to support the stem a rest 41 is inserted between the roll sections 13, 13 comprising a light bar projecting upward from a cross rod 42 carried by the side pieces, see Fig. 4, said bar curving inwardly over the cutter roll shaft 27 with its inner end extending substantially parallel to the belt 15 and a little below the same. The rest 41 is preferably fixed to the cross rod 42 and the cross rod rotatably supported in the side pieces, a screw 43 being shown in the side frame for clamping the cross rod and holding the rest in position. For cleaning the rest, the screw is loosened and the guide swung out toward the operator into exposed position, a handle 44 on one end of the rod being provided for more readily manipulating the rod. A stop 45 on the side piece limits the inward swing of said handle so the rest may be quickly and easily replaced in proper position.

An idle roller 46 is preferably arranged above the cutter roll and in front of the cutter as shown in Figs. 1 and 3 especially, said roller being journaled at its ends in brackets 47, 47 on the side frames 1, 2 and held in longitudinal position by collars 48, 48 secured by set screws or the like. This roller 46 is reduced at its middle to clear the cutter knives, and means are provided for pressing it downward against the belts 15 upon the cutter roll so as to hold the leaf flattened out thereon as it enters the machine and smooth it. Said means may be of any suitable construction but for purposes of illustration I have shown shoes 49, 49 one at each end of the roller 46 and working in a slot or recess cut in the top of the bracket bearing; the lower end of each shoe fits against the roller shaft and its upper end has a pin to receive a helical spring 50 which abuts at its upper end against a cross-bar 51 secured to the side frames 1, 2 and serves to press the shoe downward. Preferably the pins extend upward through the cross-bar and receive nuts or the like at their upper ends to limit downward movement of the shoes, and it will be obvious that the bearings in the brackets 47 for the ends of the roller shaft are elongated vertically so as to allow the shaft to move up and down.

To prevent the stem from adhering to and winding around the cutter flanges 29, 29, a stem guide 52 is provided which projects inwardly from a suitable fixture on the cross bar 51 tangentially of the cutter flanges, curving forwardly downward therewith in close proximity to the said flanges. Although it is preferable to have the guide 52 and the flanges separated so as not to touch yet the guide is close enough to deflect such stems that would otherwise wind around the cutter flanges.

In order to positively discharge the stems downward past the belts and prevent said stems from adhering to the flange 10, so that they will drop beneath the machine, a stem ejector 53 projects from the rear strut or brace 6 toward said flange preferably curving upward close to the periphery thereof to a point forward of and slightly above the lowest point of said flange. From this forward portion of the ejector which engages the flange as described, an extension 115 of the ejector projects downward beyond the belts 15, sufficient space being left between the said extension and the rest 41 to allow free passage for stems. It will be understood that the ejector 53 is a light bar preferably of rectangular cross-section, and substantially the width of the flange 10, and upon the sides of the extension 115 are side plates or guides 114 which project in front of and extend the length of said extension preferably flaring apart for receiving and guiding the stem past the belts.

It will be noted that the stem of a leaf is entirely cut out before the leaf enters between the drum and belts, and it is the purpose of my invention to allow sufficient distance between the cutter and drum so that the stem will assume its proper course before the side portions of the leaf become clamped between the drum and belts. The pressure of the idle roller 46 is light and not sufficient to hold the side portions of the leaf so that the stem cannot assume its proper position and direction upon entering the machine. The stem is compelled to take its proper course by the support 41 and cutting flanges and the side portions of the leaf follow it; the stem is thus cut out of the leaf by means which follows the stem and will shift the position of the leaf portions before it will cut across the stem. As the severed stem passes down the inner portion of the support 41 between the cutting flanges it guides the leaf portions on either side of itself down the belts 15 and between the same and the drum sections so that successive leaf portions are accurately and exactly booked. Exactness of booking is furthermore aided by having the cut away portion 11 in the flange 10, since the ends of the leaf halves first fed into the machine tend to come together somewhat, and the cut away portion 11 allows them to do so and lie flat and smooth.

The roller 16 at the front of the drum, over which the belts turn backward, is mounted in an apron consisting of end arms 54, 54 connected by a cross-piece 55 intermediate their ends and having their rear ends made fast on the shaft 56 of the top front roller 17. The shaft 57 of the roller 16 has its bearings in the forward ends of the arms 54, 54 and is provided outside one of said arms with a gear-wheel 58 which drives another wheel 59 on a brush-shaft also mounted in said arms, said driving being preferably done by an intermediate gear 60 mounted on a stud on the arm 54. Said brush-shaft comprises end portions 61, 61 journaled in the arms 54, 54 and carrying between themselves the twisted wire 62 which is provided with radially projecting bristles as is common in brush making, said twisted wire being in alinement with the shaft-portions 61, 61 and shown inserted within and secured to suitable sleeves 63 which are inserted in holes in the ends of the shaft-portions, although any other suitably equivalent construction could be employed. The sleeve 63 at the end of the brush next the gear 59 is fixed to the shaft-portion as by a set screw 64 so that the brush will be rotated as the gear rotates. The other sleeve may rotate within the shaft-portion 61 providing a long bearing. The brush is thus between the arms 54, 54 of the apron and is positioned with reference to the roller 16 so as to engage the same and brush it and the belts thereon sufficiently to disengage therefrom the ends of any leaves or halves of leaves which tend to leave their booked position and follow the belts 15 around the roller 16 because of adhesion or the like.

It will be noted that the brush just described is exposed toward the front of the machine, so that if any leaf or portion of a leaf escapes in spite of said brush it will be readily accessible to the operator and can be removed without injury or entanglement in the machine, and again fed into the machine and booked.

The apron which carries the roller 16 and brush as described is adapted to be swung upward from its position shown in the drawing, in order to expose the ends of booked leaves on the drum and enable the books to be removed or grasped for removal, and for this purpose I have shown the end of the shaft 56 upon which the apron is secured as provided with a handle 65, see Figs. 1, 4 and 12 more especially. This handle has a hub which is clamped upon the shaft 56 by a set screw or otherwise made fast thereon, and which also provides radially projecting stops 67, 68 adapted to engage from opposite sides a lug 69 projecting from the side frame and thus limit movement of the apron angularly. Obviously when the apron is lowered so that the stop 67 engages the lug 69 it will retain its position by gravity, but when the apron is raised some means is required to lock it in raised position. To this end we apply upon the inner side of the handle 65 a bolt 70 slidably mounted in a boss 71, (see Fig. 12), and adapted to enter a suitable recess in the bearing which the side frame provides for the shaft 56. The outer end of said bolt 70 has a pivotal and slotted connection to one end of a lever 72 pivoted upon the handle as at 73 and adapted to swing parallel to the inner side thereof, the outer end of said lever projecting above the handle or forward of it to form a finger piece 74 adapted to be engaged by the thumb of the same hand which grasps the handle. A spring extending from said finger piece 74 to a fixed point of the handle and marked 75 in the drawings serves to hold the bolt 70 normally in locking position or in its recess. While we prefer the locking means described, it will be obvious that various other constructions could be used for the same purpose.

The individual tension rollers 19 are each mounted in an arm 76 which is pivoted on the rear tie-rod 3 and preferably extends forward and downward therefrom. Tension upon each belt is secured by attaching to the arm 76 intermediate the roller 19 and tie-rod 3 a helical spring 77 which extends downward and rearward and is connected at its other end to the rear bottom tie-rod 4 preferably the tension of each spring is made adjustable by hooking it at one end into any one of a series of eyes 78, 79, 80 provided by a coupling 81 preferably bent at its other end around the lower tie-rod 4. It will be noted that the arms 76 with their tension roll 19 and tension springs 77 lie wholly within the lower part of the frame work of our improved machine so as to be guarded and shielded thereby against impact and injury from anything passing the machine.

In order to enable the drum to stop at the end of each complete rotation, for the insertion of a new leaf, and to enable it to be stopped and started at any time by the operator, the pulley 22 is provided with a clutch having a sliding collar 82 adapted to be operated by a lever 83 fulcrumed intermediate its ends upon a bracket 84 projecting from the side frame 2, said lever adapted to swing in a horizontal plane as shown, although of course this is not essential. Any suitable and well-known form of clutch may be employed, but we prefer to use, and have shown, the clutch set forth in the prior application of Martin Deiller Serial No. 825,259 filed March 17, 1914 and to which reference may be had for further description of said clutch if desired.

The forward end of the lever 83 or end away from the clutch lies in the fork of the upright arm 85 of a bell-crank lever pivoted upon a bracket 86, see Fig. 1, to swing in a plane transverse to the lever and having its other arm 87 projecting horizontally through the side frame 2. At the free or inner end of this arm 87 is a pin 88 projecting toward the back of the machine and normally at the upper end of a slot 89 in a link 90 which extends upward to a trip 91 pivoted as at 92 upon the inner side of the frame 2 and adapted to swing up and down to work the bell-crank lever and throw the clutch in and out. A spiral spring 93 normally holds said trip at its upper limit of movement and holds the link upward so the bell-crank lever arm 87 may swing upward and allow the clutch to be thrown in under the action of a spring 94 forming part of the clutch mechanism. This trip 91 provides at its inner side a slide-way 95 for a slide 96, said slide having at one end a portion 97 projecting from the trip far enough to engage a pin 98 on the end of the drum, which pin will however clear the trip itself. Obviously if the slide 96 is in proper position the pin 98 will engage the projection 97 and depress the trip 91 to throw out the clutch and stop the drum. In this way the drum is automatically stopped at the end of each rotation, for the insertion of a new leaf.

In order to start the drum rotating means are provided for sliding the slide 96 to withdraw its projection 97 from beneath the drum pin 98, whereupon the spring 93 will draw the trip upward and allow the clutch to be thrown in. Any suitable means could be employed but we have shown a slide releasing bell-crank 99 pivoted upon the inner side of the frame 2 with one arm extending upwardly and connected to the slide by a slot-and-pin and its other arm connected by a rod 100 to a treadle 101 mounted upon the front bottom tie-rod 4, said treadle being normally held upward to throw the slide 96 into position to be engaged by the pin 98 and stop the drum. A stop 102 projecting from the side piece 2 in the path of swing of the bell-crank 99 in proper position to limit the outward swing thereof and prevent the slide 96 from too great movement outward. Also a stop or pin 103 projects from the slide 96 near its forward end toward the trip, and works in a groove 104 in said trip as the slide is moved back and forth, said groove being limited in length so that the stop will engage the end thereof and thus limit the retractive movement of the slide 96 when the treadle is depressed.

To enable the operator to stop the drum at any time during its rotation we preferably provide a rod 105 extending from the forward end of the lever 83 transversely of the machine through the side frame 2 and pivoted at its end to the upright arm of a bell-crank lever 106 which is fulcrumed upon a bracket secured to the side frame 2, as shown in Fig. 1. The other arm of said bell-crank lever 106 is connected by a downwardly extending rod 107 to a foot treadle 108 also mounted upon the front bottom tie-rod 4 at the left-hand side of the machine and is normally held upward by a spring 109 with the clutch thrown in. Thus by simply depressing the left-hand foot treadle 108, the operator can at any time stop the machine, while by depressing the right-hand treadle 101 he can start the machine when a new leaf is inserted, and since the bell-crank arm 87 is connected by slot and pin through the link 90 to the trip 91 the trip will not be disturbed by depressing the left-hand treadle 108 which swings said arm 87 in throwing the clutch out.

It is a feature of the present invention to provide cutter knives which will cut and guide the leaf and stem to best advantage and provide a support for the knives which will not cramp or curl the leaf. To this end the knives are each formed with the face next the hub offset somewhat inwardly over the hub around the periphery as at 110 leaving an undercut 111 in the blade around the hub. Furthermore, the hub is reduced in diameter at its end next the blade as at 112 forming a peripheral groove. As the stem is sheared from the leaf, the fresh cut edge of the leaf is thus afforded room to be pressed downward past the peripheral cutting edge 110 without being in constant frictional contact at its edge with the knife and hub and therefore not curled or retarded thereby. The knives are furthermore grooved at their peripheries on the sides facing each other said grooves corresponding and forming together a radially open stem receiving groove 113 in which the stem will lie and allow the leaf to be in contact with the periphery of the knife as the stem is sheared therefrom, the passage of the stem in said groove serving to guide the leaves properly as they are fed to the machine.

Having thus described the invention, what we claim is:

1. The combination of a drum, a series of rollers parallel to said drum and spaced around the same, belts extending nearly around said drum and backward around said rollers outside the same, means for driving two of said rollers on opposite sides of the drum to propel said belts, and means for cutting the stem out of a leaf as it enters between the drum and the belts.

2. The combination of a drum, a series of rollers parallel to said drum and spaced around the same, belts extending nearly around said drum and backward around said rollers outside the same, means for driving two of said rollers at opposite ends of the portion of the length of the belts which extends around the drum to propel said belts, and means for cutting the stem out of a leaf as it enters between the drum and the belts.

3. The combination of a drum, a series of rollers parallel to said drum and spaced around the same, belts extending nearly around said drum and backward around said rollers outside the same, means for driving two of said rollers adjacent the portion of the length of the belts which extends around the drum to propel said belts, means for applying tension to said belts between said driven rollers, and means for cutting the stem out of a leaf as it enters between the drum and the belts.

4. The combination of a drum, a series of rollers parallel to said drum and spaced around the same, one of said rollers being located near the bottom of the drum in front of it and another at the top of said drum in front of it and another at the top of said drum in back of it, belts extending around said drum and backward around said top and bottom front rollers outside the same and the other rollers, means for driving said bottom front roller and top back roller to propel said belts, and means for cutting the stem out of a leaf as it enters between the drum and the belt.

5. The combination of a drum, a series of rollers parallel to said drum and spaced around the same, belts extending nearly around said drum and backward around said rollers outside the same, means for driving one of the rollers from which the belts pass to the drum, a cutter coöperating with said roller to remove the stem from a leaf, and means for driving said cutter from said roller.

6. The combination of a drum, a cutting roll at a distance from the drum, a belt extending nearly around said drum and backwardly around said cutting roll and rollers, a cutter coöperating with said cutting roll, and means for driving said cutter from the cutting roll.

7. The combination of a drum, a cutting roll and cutter coöperating therewith at a distance from the drum, a belt extending nearly around the drum and backwardly over said cutting roll and rollers, and driving means.

8. The combination of a drum, a cutter roll at a distance from said drum, a belt passing over said cutter roll and under said drum, a cutter coöperating with said cutter roll to remove the stem from a leaf fed onto said belt before it enters between the belt and drum, and driving means.

9. The combination of a drum, a cutter roll at a distance from said drum having spaced cutting flanges, other rollers around the drum, belts passing over said cutter roll under the drum and over the other rollers, a cutter above said cutter roll coöperating therewith to remove the stem from a leaf before it enters between the belts and drum, and driving means.

10. The combination of a drum, a flanged cutter roll at a distance from said drum, belts passing over said cutter roll and under said drum, a pressure roller engaging said cutter roll to feed a leaf, a cutter above said cutter roll and back of said pressure roller coöperating with said cutter roll to remove the stem from a given portion of a leaf before said portion of the leaf enters between the drum and belts, and means for driving said cutter roll and cutter.

11. The combination of a drum, a cutter roll mounted in fixed bearings at a distance from said drum, belts passing over said cutter roll and under said drum, a pressure roller resiliently engaging said belts on the cutter roll and adapted to feed the leaves, a cutter coöperating with said cutter roll back of said pressure roller to remove the stem from a leaf before the same enters between the drum and belts, and means for driving said cutter roll.

12. The combination with a flanged cutter roll, a cutter having parallel cutting disks working between the flanges of said cutter roll, means for resiliently holding said disks against the said flanges, and means for rotating said cutter, of a fixed support substantially parallel to said cutter roll adjacent the cutter, a stem guide projecting from said support curved around that part of the periphery of said cutter away from the cutter roll and covering the space between its disks adjacent their issuance from the cutter roll flanges, and means for adjustably clamping said stem guide to its support.

13. The combination of a flanged cutter roll, a cutter having separated disks working between the flanges of said cutter roll, a fixed support parallel to said cutter roll adjacent said cutter, a pressure roll resiliently supported upon said support in engagement with the cutter roll, a stem guide projecting from said support and covering the space between the cutting disks, and means for driving said cutter roll and cutter.

14. The combination with a shaft, a cutter roll comprising spaced sections on said shaft, a cutter having parallel cutting disks working between said sections of the cutter rolls, means for resiliently holding said disks against said sections, and means for rotating said cutter, of a stem rest between said sections of the cutter roll mounted upon an axis with respect to which it may be adjusted so as to vary the relation of the stem supporting surface of the rest with respect to the cutter roll sections, whereby the stems may be guided from between the said sections.

15. The combination with a cutter roll comprising spaced sections on a shaft, of a curved stem rest between said sections closing the space therebetween against passage of a stem radially toward the shaft and having one end of itself projecting outside said sections, means pivotally supporting said rest by said projecting end, and means for setting said rest in desired position.

16. The combination with a cutter roll comprising spaced sections on a shaft, of a curved stem rest between said sections closing the space therebetween against passage of a stem radially toward the shaft and having its ends projecting outside said sections, means pivotally supporting said rest by one of said projecting ends, and means for setting said rest in desired position.

17. The combination of a drum having a flange, a cutter roll, a cutter coöperating with said roll, belts passing over said cutter roll and under the drum on opposite sides of the flange thereof, a stem ejector beneath the drum having a free end directed toward the cutter roll and adapted to engage the flange of the drum, and means for driving said cutter roll.

18. The combination of a drum having a flange, a cutter roll, a cutter coöperating with said roll, belts passing over said cutter roll and under the drum on opposite sides of the flange thereof, a stem ejector beneath the drum having a free end directed toward the cutter roll adjacent the flange of the drum and bent downward to project between said belts, and driving means.

19. The combination with a drum, of an apron hinged to swing toward and away from said drum, a roller at the free end of said apron, a belt passing around the drum and turning back over said roller, a cutter adjacent said drum and apron, a brush mounted in said apron engaging the belt and cutter, and means for driving said brush.

20. The combination of a frame having shaft bearings one with an outside radial socket therein, a drum mounted in said frame, a shaft rotatably mounted in said bearings parallel to said drum, a roller on said shaft, an apron fixed on said shaft, a belt extending around said drum and backward over the apron, a handle fast on said shaft adjacent said socketed bearing for swinging said apron, a slidable locking bolt disposed radially of the shaft on said handle and adapted to enter the socket, and a lever for operating said locking bolt.

21. The combination of a frame, a drum mounted in said frame, a shaft journaled in said frame parallel and adjacent to said drum, a roller on said shaft, an apron fixed on said shaft, a belt for said drum and apron, a handle fast on said shaft for swinging said apron, coöperating stops on said handle and frame forming limits to upward and downward movement of the apron, and locking means on said handle for engaging the frame to hold the apron elevated when said stops engage to limit upward movement.

22. The combination with means for removing the rib from a leaf, of a drum having a segmental flange adapted to enter between the halves of the leaf for only a portion of the length of the slit made by removing the rib, and means for conducting the halves of the leaf onto said drum.

23. The combination with means for removing the rib from a leaf, of a drum having a segmental flange discontinued for that portion of the circumference of the drum which is adapted to receive the tip portion of the leaf, and means for conducting the halves of the leaf onto said drum.

24. The combination with means for removing the rib from a leaf, of a drum having a circumferential rib discontinued or cut away for a portion of the circumference, and means for conducting the halves of the leaf onto said drum at opposite sides of said flange with their tip portions at that circumferential part of the drum where the flange is discontinued or cut away.

25. The combination with means for removing the rib from a leaf, of a drum closed peripherally and having a flange intermediate its ends extending around the drum for a portion of its circumference, and means for conducting the halves of a leaf onto said drum at opposite sides of said flange with their tip portions at that circumferential part of the drum where there is no flange.

MARTIN DEILLER.
EUGENE MARTIN DEILLER.

Witnesses:
HOWARD P. KING,
JANET A. AYERS.